United States Patent
Harrison et al.

(10) Patent No.: US 9,896,385 B2
(45) Date of Patent: Feb. 20, 2018

(54) CONTIGUOUSLY BLENDED NANO-SCALED MULTI-PHASE FIBERS

(71) Applicant: FREE FORM FIBERS, LLC, Saratoga Springs, NY (US)

(72) Inventors: Shay Llewellyn Harrison, East Schodack, NY (US); Joseph Pegna, Saratoga Springs, NY (US); John L. Schneiter, Cohoes, NY (US); Kirk L. Williams, Saratoga Springs, NY (US); Ramkiran Goduguchinta, Ballston Lake, NY (US)

(73) Assignee: FREE FORM FIBERS, LLC, Saratoga Springs, NY (US)

( * ) Notice: Subject to any disclaimer, the term of this patent is extended or adjusted under 35 U.S.C. 154(b) by 0 days.

(21) Appl. No.: 15/114,504

(22) PCT Filed: Jan. 26, 2015

(86) PCT No.: PCT/US2015/012822
§ 371 (c)(1),
(2) Date: Jul. 27, 2016

(87) PCT Pub. No.: WO2015/112935
PCT Pub. Date: Jul. 30, 2015

(65) Prior Publication Data
US 2016/0347672 A1    Dec. 1, 2016

Related U.S. Application Data

(60) Provisional application No. 61/931,757, filed on Jan. 27, 2014.

(51) Int. Cl.
| | |
|---|---|
| *C04B 35/628* | (2006.01) |
| *D01F 9/08* | (2006.01) |
| *D01F 8/18* | (2006.01) |
| *C04B 35/622* | (2006.01) |

(Continued)

(52) U.S. Cl.
CPC ........ *C04B 35/62884* (2013.01); *C04B 35/56* (2013.01); *C04B 35/565* (2013.01);
(Continued)

(58) Field of Classification Search
CPC ... C01G 23/005; F16D 69/02; C01P 2004/03; C01P 2004/20; C01P 2004/61; C01P 2004/10
See application file for complete search history.

(56) References Cited

U.S. PATENT DOCUMENTS 4,360,372 A * 11/1982 Maclejko .............. C03B 37/028
385/115
5,017,316 A * 5/1991 Sowman ................... D01F 9/08
264/177.11

(Continued)

OTHER PUBLICATIONS

Harrison et al., International Search Report & Written Opinion for PCT/US2015/012822, filed Jan. 26, 2015 PCT (Publication No. WO 2015/112935 A1), dated May 7, 2015 (11 pages).

(Continued)

*Primary Examiner* — Noah S Wiese
(74) *Attorney, Agent, or Firm* — Kevin P. Radigan, Esq.; Heslin Rothenberg Farley & Mesiti P.C.

(57) ABSTRACT

A multi-component or 'composite' inorganic fiber comprising a nano-scale contiguous collection of a plurality of packed unique phases of material randomly interspersed throughout the fiber body, without unwanted impurities, and a method for producing same. Said phases include three or more foundational chemical elements from the Periodic Table mixed together during fiber production, producing distinct material phases interspersed throughout the fiber volume.

9 Claims, 5 Drawing Sheets

(51) Int. Cl.
  *C04B 35/56* (2006.01)
  *C04B 35/565* (2006.01)
  *C04B 35/58* (2006.01)
  *C04B 35/581* (2006.01)
  *C04B 35/583* (2006.01)

(52) U.S. Cl.
  CPC ........ *C04B 35/5607* (2013.01); *C04B 35/581* (2013.01); *C04B 35/583* (2013.01); *C04B 35/5805* (2013.01); *C04B 35/58007* (2013.01); *C04B 35/6229* (2013.01); *C04B 35/62272* (2013.01); *C04B 35/62277* (2013.01); *C04B 35/62281* (2013.01); *C04B 35/62286* (2013.01); *D01F 8/18* (2013.01); *D01F 9/08* (2013.01); *C04B 2235/3804* (2013.01); *C04B 2235/386* (2013.01); *C04B 2235/3813* (2013.01); *C04B 2235/3821* (2013.01); *C04B 2235/3826* (2013.01); *C04B 2235/3839* (2013.01); *C04B 2235/3856* (2013.01); *C04B 2235/3865* (2013.01); *C04B 2235/3891* (2013.01); *C04B 2235/421* (2013.01); *C04B 2235/428* (2013.01); *C04B 2235/614* (2013.01); *C04B 2235/80* (2013.01)

(56) References Cited

U.S. PATENT DOCUMENTS

| | | |
|---|---|---|
| 5,096,739 A | 3/1992 | Strutt et al. |
| 5,383,963 A * | 1/1995 | Kobayashi .......... C01G 23/005 106/36 |
| 5,705,122 A | 1/1998 | Curran |
| 5,786,023 A | 7/1998 | Maxwell et al. |
| 2005/0048859 A1 | 3/2005 | Canahan et al. |
| 2005/0247904 A1 | 11/2005 | Raj et al. |
| 2005/0255033 A1 | 11/2005 | Shimoji et al. |
| 2006/0115648 A1 | 6/2006 | Chen |
| 2012/0315815 A1 | 12/2012 | Fong et al. |
| 2013/0093122 A1 | 4/2013 | Schulz et al. |
| 2015/0004393 A1 | 1/2015 | Pegna et al. |

OTHER PUBLICATIONS

Harrison et al., Supplementary Partial European Search Report for EP 15741094.5, dated Jul. 21, 2017 (20 pages).

Waku et al., "An Amorphous Ceramic Al32.4Er7.6O60 Fiber with Large Viscous Flow Deformation and a High-Strength Nanocrystallized Ceramic Fiber", Journal of Materials Science, vol. 36, No. 10, pp. 2435-2440 (May 15, 2001).

Lee et al., "Microstructure and Mechanical Properties of Al2O3/Y3Al5O12/ZrO2 Ternary Eutectic Materials", Journal of European Ceramic Society, vol. 25, No. 8, pp. 1411-1417 (Jan. 1, 2005).

Liao et al., "Large-Scale Aligned Silicon Carbonitride Nanotube Arrays: Synthesis, Characterization, and Field Emission Property", Journal of Applied Physics, vol. 101, No. 11, pp. 114306.1-114306.4 (Jun. 7, 2007).

Zhang et al., "Ferromagnetism Induced by Intrinsic Defects and Boron Substitution in Single-Wall SiC Nanotubes", Journal of Physical Chemistry, vol. 115, No. 35, pp. 9987-9992 (Sep. 8, 2011).

\* cited by examiner

CONTIGUOUSLY BLENDED NANO-SCALED MULTI-PHASE FIBERS

RELATED APPLICATION INFORMATION

This application is a § 371 U.S. National Phase application which claims priority from International Application Serial No. PCT/US2015/012822, filed Jan. 26, 2015, which published Jul. 30, 2015, as PCT Publication No. WO 2015/112935 A1, and which claims the benefit of U.S. provisional patent application Ser. No. 61/931,757, filed Jan. 27, 2014, each of which is hereby incorporated herein by reference in its entirety.

GOVERNMENT INTEREST

The subject matter of the invention may be subject to U.S. Government Rights under National Science Foundation grant: NSF SBIR Grant IIP-1152698.

TECHNICAL FIELD

The present invention relates to high performance ceramic and other inorganic fibers, and methods of their manufacture.

BACKGROUND OF THE INVENTION

High Performance Fibers (HPFs) are being proposed for expanding uses in many specialized applications, such as military and aerospace (turbo machinery, rockets, advanced structures), automobile, biomedical, energy, and other applications that require advanced materials with exceptional strength, stiffness, heat resistance, and/or chemical resistance. HPFs are sought when a combination of extreme material properties is required which cannot be met by existing metal filaments or by carbon, glass, vegetal or mineral fibers. HPF composite systems generally include a plurality of coated fibers, distributed within a "matrix."

Almost all inorganic (ceramic) fibers are produced today by forcing a liquid polymeric precursor (such as polycarbosilanes for silicon carbide [SiC] fibers) that carries the elements of interest through a spinneret to produce what are called green fibers, which are then heated in kilns or furnaces to pyrolyze and sinter the materials into an acceptable fiber. One consequence of this approach has been that unwanted impurities—in particular oxygen—are typically left behind and "locked in" to the final product. In SiC fibers, for example, this gives rise to oxy-carbide impurity phases in the fiber microstructure which tends to decompose into gases at high temperature, thus limiting the temperatures at which such fibers can be used.

SUMMARY OF THE INVENTION

The shortcomings of the prior art are addressed, and additional advantages are provided, by the present invention which in one aspect uses LCVD and multiple precursor gases to produce targeted "composite" ceramic fibers with nano-scale contiguous crystalline phases or when working near the boundary of the phase space offers an opportunity to produce doped materials. An example might be a "composite" fiber produced via LCVD using the precursor gases silane, diborane and ethylene, to contribute silicon, boron and carbon, respectively, said fiber comprising a contiguous mixture of nano-crystals and/or amorphous regions of silicon carbide, boron carbide and borosilicides.

In one aspect of the invention, this method results in a multi-component or 'composite' inorganic fiber comprising a nano-scale contiguous collection of a plurality of (tightly) packed unique phases of material randomly interspersed throughout the fiber body, without unwanted impurities, and a method for producing same. Said phases are include three or more foundational chemical elements from the Periodic Table mixed together during fiber production, producing distinct material phases interspersed throughout the fiber volume.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter regarded as the invention is particularly pointed out and distinctly claimed at the conclusion of the specification. The foregoing and other objects, features, and advantages of the invention are apparent from the following detailed description taken in combination with the accompanying drawings in which:

DETAILED DESCRIPTION OF THE INVENTION

One way to avoid unwanted fiber impurities is to avoid the use of polymeric precursors altogether and use laser-assisted chemical vapor deposition (LCVD) as is described in U.S. Pat. No. 5,786,023 by Maxwell and Pegna, the entirety of which is hereby incorporated by reference herein. In this process pure precursor gases (such as silane and ethylene in the case of SiC fiber production) are introduced into a reactor within which a suitable substrate such as glassy carbon is positioned, and laser light is focused onto the substrate. The heat generated by the focused laser beam breaks down the precursor gases locally, and the atomic species deposit onto the substrate surface and build up locally to form a fiber. If either the laser or the substrate is pulled away from this growth zone at the growth rate a continuous fiber filament will be produced with the very high purity of the starting gases. With this technique there are virtually no unwanted impurities, and in particular no performance-robbing oxygen.

Very pure fibers can be produced using LCVD, such as silicon carbide, boron carbide, silicon nitride and others. The inventors have discovered that if a material has been deposited using CVD, there is a good chance that fiber can be produced using LCVD. Unlike with liquid polymeric precursors, however, where the chemistry can be very involved and complicated even for relatively 'simple' materials such as those mentioned above, LCVD can also be used quite directly to produce novel mixes of solid phases of different materials that either cannot be made or have not been attempted using polymeric precursor and spinneret technology. Examples include fibers composed of silicon, carbon and nitrogen contributed by the precursor gases such as silane, ethylene and ammonia, respectively, where the resulting "composite" fiber contains tightly integrated phases of silicon carbide, silicon nitride and silicon carbonitrides depending on the relative concentrations of precursor gases in the reactor. Such new and unique fibers can exhibit very useful properties such as high temperature resistance, high strength and good creep resistance at low relative cost.

Disclosed below is a novel multi-component or 'composite' inorganic fiber comprising a nano-scale contiguous collection of a number of tightly packed unique phases of material randomly interspersed throughout the fiber body, without unwanted impurities, and a method for producing same.

Figure 1:
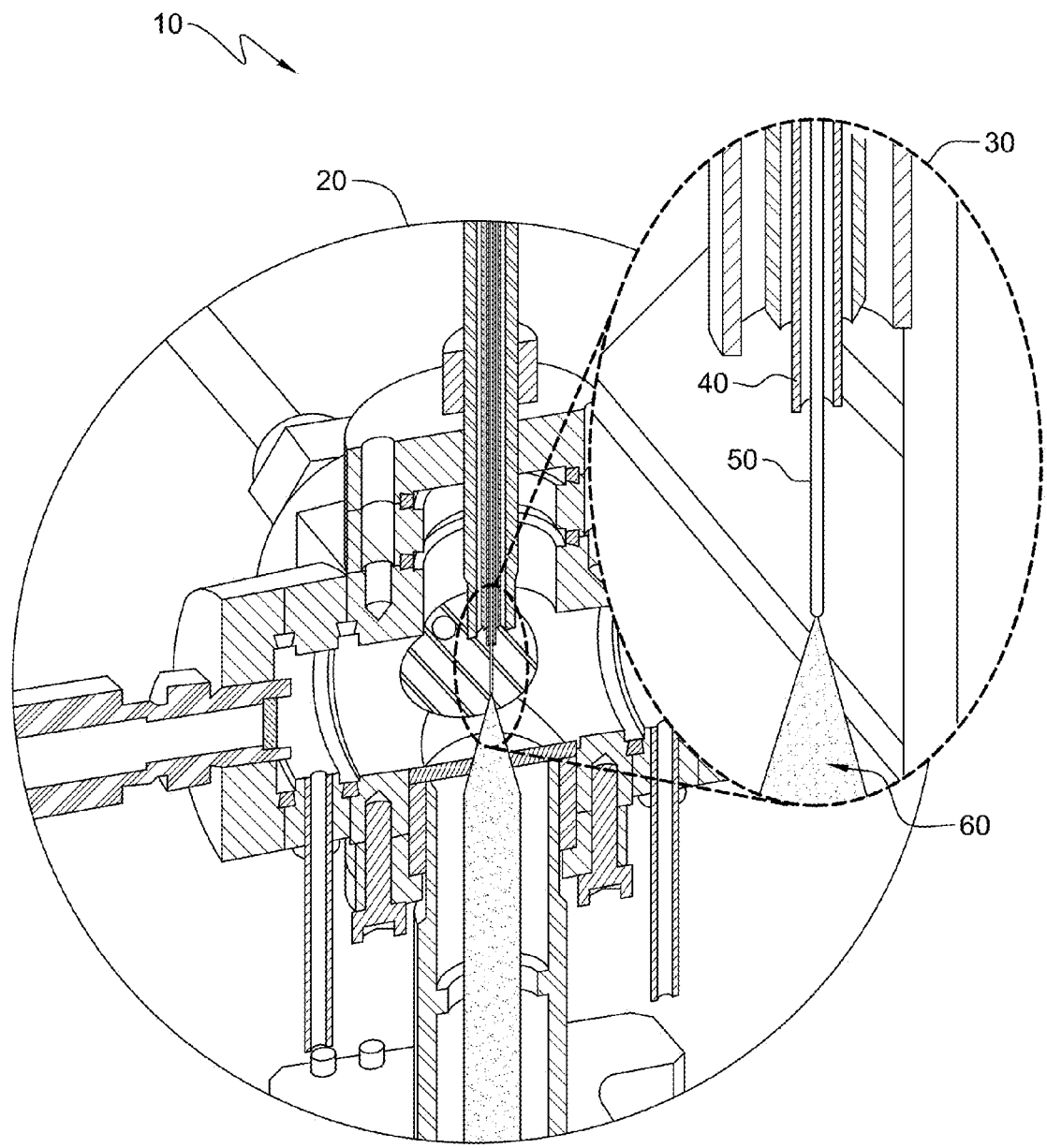
FIG. 1 is a schematic representation of a single-fiber reactor, showing a seed fiber substrate, a reactor cube into which precursor gases are delivered, a focused laser beam impinging on the seed fiber, and reactor windows that are transparent to the incoming laser beam wavelength and allow for video monitoring of the process.

FIG. 1 shows a LCVD reactor into which a substrate seed fiber has been introduced, onto the tip of which a laser beam is focused. (It will be seen that the substrate may be any solid surface capable of being heated by the laser beam. It will further be seen that multiple lasers could be used simultaneously to produce multiple simultaneous fibers as is taught in International Patent Application Ser. No. US2013/022053 by Pegna et al.,—also filed on Jul. 14, 2014 as U.S. Patent Application entitled HIGH STRENGTH CERAMIC FIBERS AND METHODS OF FABRICATION, U.S. Ser. No. 14/372,085—the entireties of which are hereby incorporated by reference herein.) In accordance with that Application, FIG. 1 more particularly shows a reactor 10; enlarged cutout view of reactor chamber 20; enlarged view of growth region 30. A self-seeded fiber 50 grows towards an oncoming coaxial laser 60 and is extracted through an extrusion microtube 40.

A mixture of precursor gases can be introduced at a desired relative partial pressure ratio and total pressure. The laser is turned on, generating a hot spot on the substrate, causing local precursor breakdown and local CVD growth in the direction of the temperature gradient, typically along the axis of the laser beam. Material will deposit and a fiber will grow, and if the fiber is withdrawn at the growth rate, the hot spot will remain largely stationary and the process can continue indefinitely, resulting in an arbitrarily long CVD-produced fiber.

Figure 2:
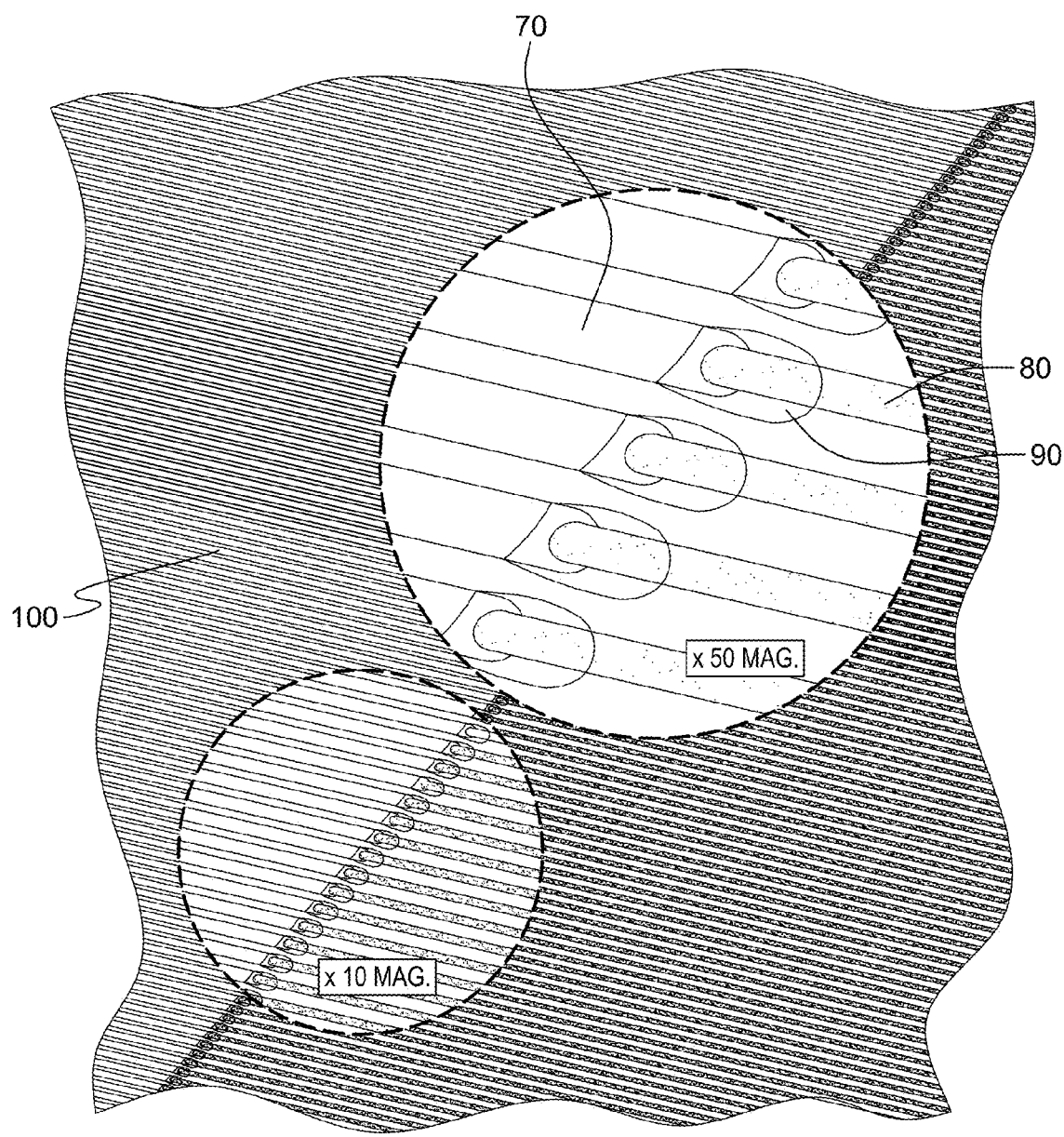
FIG. 2 is a schematic view showing how fiber LCVD can be massively parallelized by multiplication of the laser beams.
Figure 3:
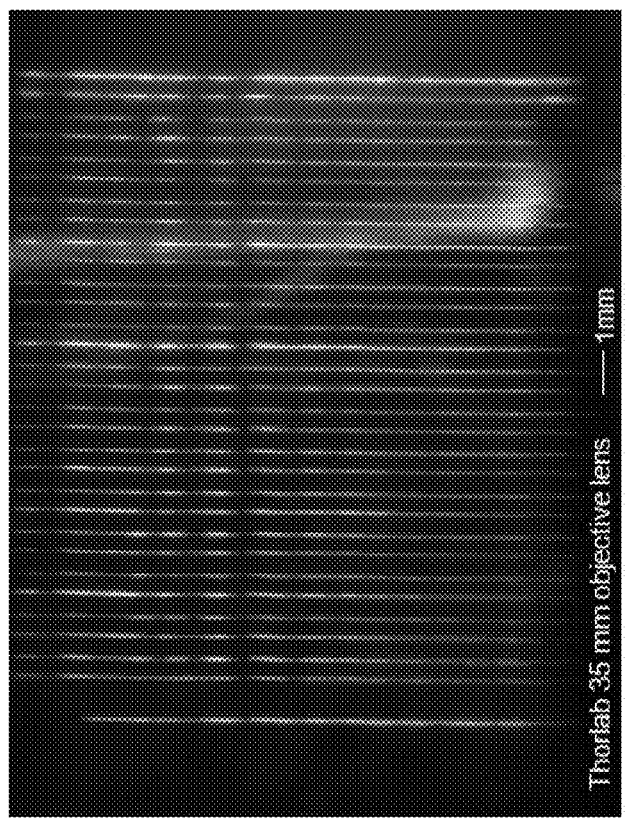
FIG. 3 is an example of parallel LCVD growth of carbon fibers.
Figure 3:
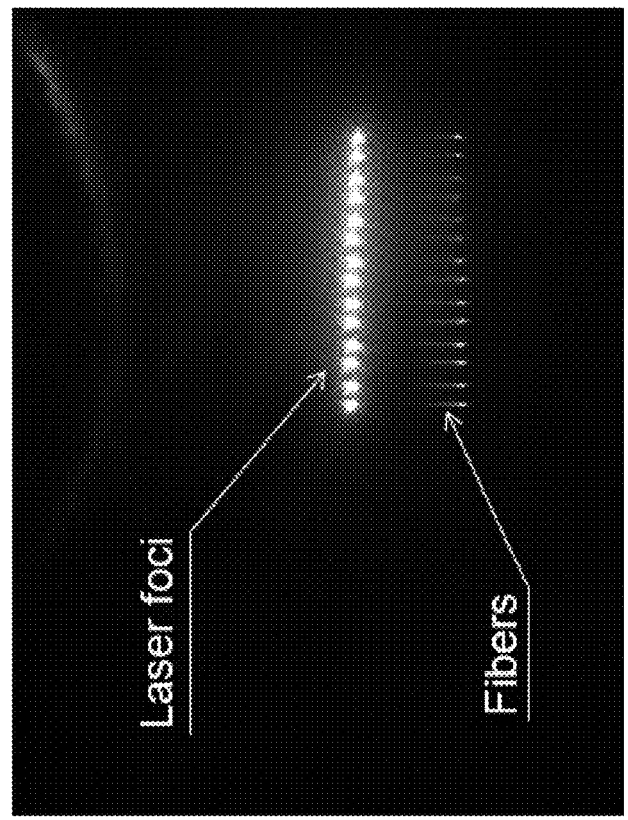

Also in accordance with that Application, a large array of independently controlled lasers can be provided, growing an equally large array of fibers 80 in parallel, as illustrated in FIG. 2, showing how fiber LCVD can be massively parallelized from a filament lattice 100 by multiplication of the laser beams 80 inducing a plasma 90 around the tip of each fiber 70. Using a CtP (e.g., QWI) laser array for LCVD is a scientific first, and so was the use of a shallow depth of focus. It provides very beneficial results. Sample carbon fibers, such as those shown in FIG. 3, were grown in parallel. FIG. 3 shows parallel LCVD growth of carbon fibers—Left: Fibers during growth and Right: Resulting free standing fibers 10-12 μm in diameter and about 5 mm long.

Figure 4:
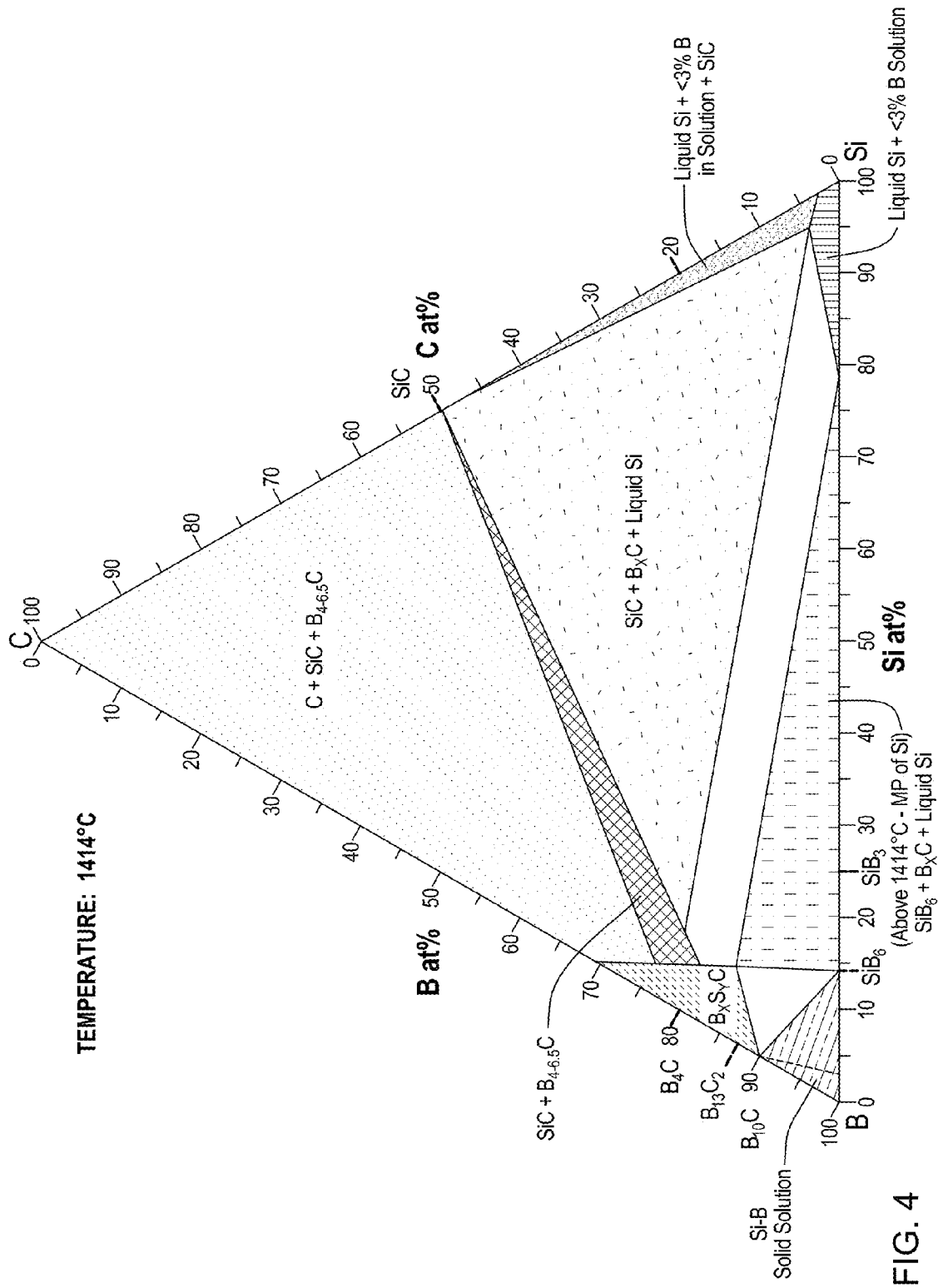
FIG. 4 is a ternary phase diagram of the Si—C—B ternary system at 1414 deg C., and shows in detail where in "element space" the various phases of the Si—C—B material system occur, thereby providing regional targets for various fiber compositions achievable via judicious choice of precursor gas concentration ratios in accordance with the present invention.

In accordance with the present invention, a given partial pressure ratio of precursor gases will produce fibers with a composition that can be plotted on a standard phase diagram. For example, a given relative ratio of silane, ethylene and boron trichloride gases will produce a fiber whose composition can be analyzed and the result plotted on the ternary phase diagram shown in FIG. 4. It can be seen that if the point lies within a given region of the diagram, and the fiber composition needs to be modified to achieve some different desired property or properties, the relative precursor gas concentration ratios can be modified to "drive" the point to a different location on the phase diagram. It will be clear to those skilled in the art that with a few data points to provide a sparse calibration map within the phase diagram, a "calibration surface" can be fit to the diagram to provide a reasonably good estimate of the relative precursor gas ratios required to produce fiber with a given composition within the phase diagram. It will also be clear to those skilled in the art that fibers comprising more than three elements, whose phases can be represented on higher dimensional phase diagrams, are producible with the LCVD process by introducing additional gases, and that higher order "calibration surfaces" can be constructed in order to provide relative precursor gas ratios that will generate fibers whose compositions lie within a desired position on the higher dimensional phase diagrams.

Unique features of this invention include targeted multi-element "composite" ceramic fibers with nano-scale contiguous crystalline phases without unwanted impurities. Another unique feature of this invention is that such fibers can now be produced, whereas prior to this invention it has not been possible. A further unique feature of the invention is that ternary and higher-order phase diagrams can be used to assist in the development of relative precursor gas ratios required to produce fiber with a given composition within the phase diagram Advantages of the present invention include targeted multi-element "composite" ceramic fibers with nano-scale contiguous crystalline phases without unwanted impurities and the ability to produce same. Another advantage is that such fibers are likely to exhibit interesting properties not available today. A further advantage is that such fibers have heretofore not been achievable and new markets will likely open as a result.

Figure 5:
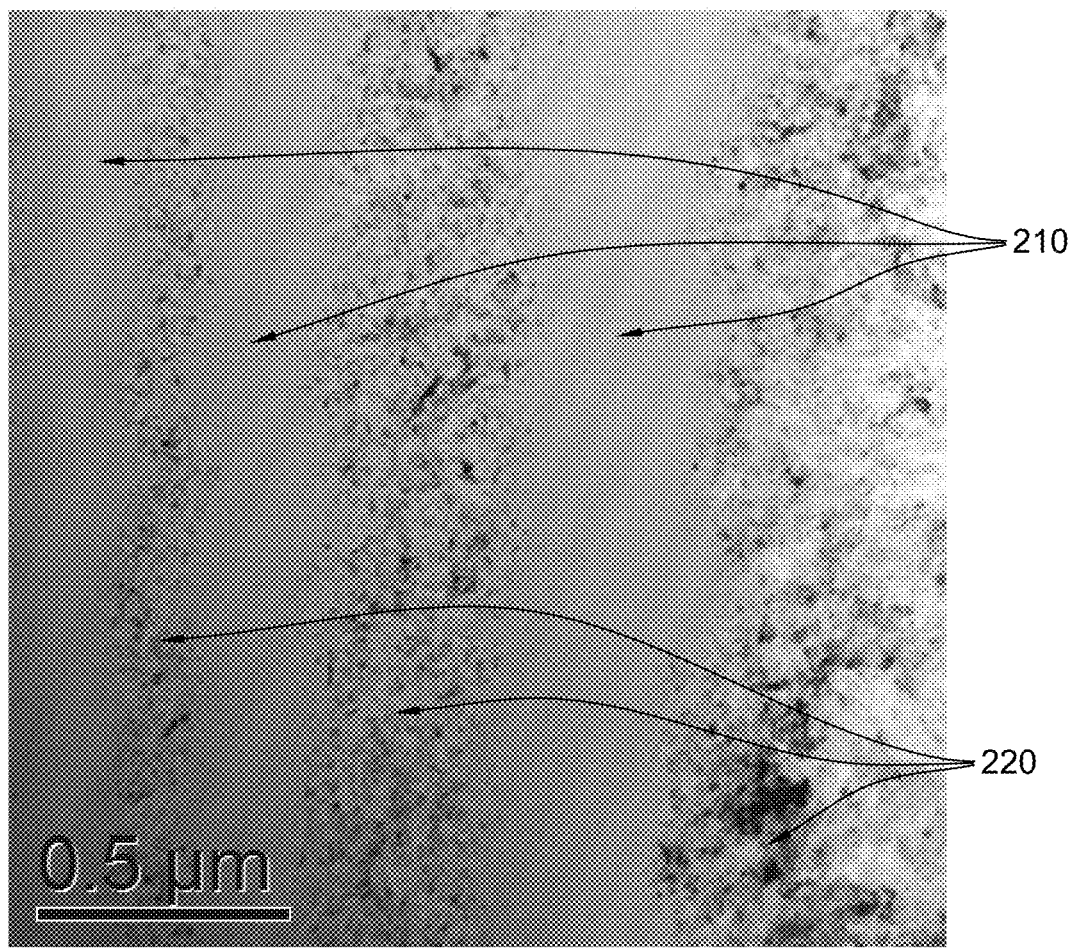
FIG. 5 is an electron microscopy image of alternating nano-crystalline (less than 5 nanometers in grain size as determined by electron diffraction) layers and near-amorphous layers in an exemplary silicon carbide fiber.

In one fabrication example, and with reference to fiber 200 of FIG. 5, small amounts of boron in the starting raw material composition lead to significant contributions of boron appearing in formed silicon carbide (SiC) fiber; including amorphous (non-crystalline) SiC layers 210 that contain boron, and Nano-crystalline grain SiC layers 220 that contain boron. The boron is widely distributed throughout the fiber cross-section and thus likely incorporated into the silicon carbide crystal structure. Auger electron spectroscopy (AES) elemental analysis found boron to present at levels approximately of 20 atomic percent, in a fairly homogenous distribution throughout the fiber cross-section. Subsequent nano-scale electron energy loss spectroscopy (EELS) evaluation supports these findings. X-ray and electron diffraction analyses reveal no crystalline boron species present in the fiber, supporting the notion that the boron is captured and locked in to the silicon-carbon lattice.

The boron content appears to locally concentrate in amorphous and near-amorphous regions, with crystalline sizes varying from 1 to 5 nanometers (see image below), while regions of larger grain size (on the order of 5 to 30 nanometers) show reduced boron content relative to the smaller grained-areas. As part of this trend, the boron content is slightly more concentrated at the outer diameter section of the fiber, paralleling the decreasing grain size found in manufactured silicon carbide fibers moving from the center to the outer fiber diameter. The measured grain sizes with boron present are significantly different from similar evaluations performed on SiC-only fibers, which generally have the smallest grain sizes in the 5 to 10 nanometer range.

The present invention includes the following, alone or in any combination, and/or in combination with the subject matter of International Patent Application Ser. No. US2013/022053 by Pegna et al.,—also filed on Jul. 14, 2014 as U.S. Patent Application entitled HIGH STRENGTH CERAMIC FIBERS AND METHODS OF FABRICATION, U.S. Ser. No. 14/372,085—the entireties of which are hereby incorporated by reference herein, and/or the subject matter of U.S. Pat. No. 5,786,023 by Maxwell and Pegna, the entirety of which is hereby incorporated by reference herein:

Multi-component or 'composite' inorganic fibers comprising a nano-scale contiguous collection of a number of (tightly) packed unique phases of material randomly interspersed throughout the fiber body, without unwanted impurities; said phases comprising three or more foundational chemical elements from the Periodic Table mixed together during fiber production, producing distinct material phases interspersed throughout the fiber volume.

A multi-component or 'composite' fiber comprising a nano-scale contiguous collection of a number of tightly packed unique phases of the three elements including silicon, carbon and boron, the phases including silicon carbide, boron carbide, silicon carbonitride, and boron silicide.

A multi-component or 'composite' fiber comprising a nano-scale contiguous collection of a number of tightly packed unique phases of the three elements including silicon, carbon and boron, the phases including silicon carbide, boron carbide, silicon carbonitride, and free silicon.

A multi-component or 'composite' fiber comprising a nano-scale contiguous collection of a number of tightly packed unique phases of the three elements including silicon, carbon and boron, the phases including silicon carbide, boron carbide,—and free boron.

A multi-component or 'composite' fiber comprising a nano-scale contiguous collection of a number of tightly packed unique phases of the three elements including silicon, carbon and boron, the phases including silicon carbide, boron carbide, free boron and free silicon.

A multi-component or 'composite' fiber comprising a nano-scale contiguous collection of a number of tightly packed unique phases of the three elements including silicon, carbon and nitrogen, the phases including silicon carbide, silicon nitride, and silicon carbonitride.

A multi-component or 'composite' fiber comprising a nano-scale contiguous collection of a number of tightly packed unique phases of the three elements including silicon, carbon and nitrogen, the phases including silicon carbide, silicon nitride, silicon carbonitride, and free silicon.

A multi-component or 'composite' fiber comprising a nano-scale contiguous collection of a number of tightly packed unique phases of the three elements including:

Aluminum, boron, and nitrogen, the phases including aluminum nitride, boron nitride, aluminum boride, and free boron Aluminum, carbon, and nitrogen, the phases including aluminum carbide, aluminum nitride, and aluminum carbonitrides Molybdenum, carbon, and nitrogen, the phases including molybdenum carbide, molybdenum nitride, and free molybdenum Molybdenum, boron, and carbon, including the phases molybdenum carbide, boron carbide, molybdenum boride, free boron, and free molybdenum The method of producing multi-component or 'composite' fiber comprising a nano-scale contiguous collection of a number of tightly packed unique phases, wherein a reactor and a laser or lasers grow the fibers according to Laser Induced Chemical Vapor Deposition, wherein fiber compositions resulting from given relative ratios of a set of precursor gases can be plotted on a phase diagram, and a response surface constructed from said data, in order to develop a new target relative ratio set of the precursor gases in order to produce a fiber with a composition from a desired position on the phase diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A multi-component or 'composite' inorganic fiber comprising a nano-scale contiguous collection of a plurality of packed unique phases of material randomly interspersed throughout the fiber, said phases comprising three or more elements from the Periodic Table mixed together during fiber production using Laser Induced Chemical Vapor Deposition, producing said unique phases interspersed throughout the fiber, wherein the three elements include silicon, carbon and boron, the unique phases including silicon carbide, boron carbide, silicon carbonitride, and boron silicide.

2. A multi-component or 'composite' inorganic fiber comprising a nano-scale contiguous collection of a plurality of packed unique phases of material randomly interspersed throughout the fiber, said phases comprising three or more elements from the Periodic Table mixed together during fiber production using Laser Induced Chemical Vapor Deposition, producing said unique phases interspersed throughout the fiber, wherein the three elements include silicon, carbon and boron, the phases including silicon carbide, boron carbide, silicon carbonitride, and free silicon.

3. A multi-component or 'composite' inorganic fiber comprising a nano-scale contiguous collection of a plurality of packed unique phases of material randomly interspersed throughout the fiber, said phases comprising three or more elements from the Periodic Table mixed together during fiber production using Laser Induced Chemical Vapor Deposition, producing said unique phases interspersed throughout the fiber, wherein the three elements include silicon, carbon and boron, the phases including silicon carbide, boron carbide, and free boron.

4. A multi-component or 'composite' inorganic fiber comprising a nano-scale contiguous collection of a plurality of packed unique phases of material randomly interspersed throughout the fiber, said phases comprising three or more elements from the Periodic Table mixed together during fiber production using Laser Induced Chemical Vapor Deposition, producing said unique phases interspersed throughout the fiber, wherein the three elements include silicon, carbon and boron, the phases including silicon carbide, boron carbide, free boron and free silicon.

5. A multi-component or 'composite' inorganic fiber comprising a nano-scale contiguous collection of a plurality of packed unique phases of material randomly interspersed throughout the fiber, said phases comprising three or more elements from the Periodic Table mixed together during fiber production using Laser Induced Chemical Vapor Deposition, producing said unique phases interspersed throughout the fiber, wherein the three elements include silicon, carbon and nitrogen, the phases including silicon carbide, silicon nitride, and silicon carbonitride.

6. A multi-component or 'composite' inorganic fiber comprising a nano-scale contiguous collection of a plurality of packed unique phases of material randomly interspersed throughout the fiber, said phases comprising three or more elements from the Periodic Table mixed together during fiber production using Laser Induced Chemical Vapor Deposition, producing said unique phases interspersed throughout the fiber, wherein the three elements include silicon, carbon and nitrogen, the phases including silicon carbide, silicon nitride, silicon carbonitride, and free silicon.

7. A multi-component or 'composite' fiber comprising a nano-scale contiguous collection of a number of packed unique phases of the three elements including:
   a. aluminum, boron, and nitrogen, the phases including aluminum nitride, boron nitride, aluminum boride, and free boron;
   b. aluminum, carbon, and nitrogen, the phases including aluminum carbide, aluminum nitride, and aluminum carbonitrides;
   c. molybdenum, carbon, and nitrogen, the phases including molybdenum carbide, molybdenum nitride, and free molybdenum; or
   d. molybdenum, boron, and carbon, including the phases molybdenum carbide, boron carbide, molybdenum boride, free boron, and free molybdenum.

8. A method of producing a multi-component or 'composite' fiber comprising a nano-scale contiguous collection of a number of packed unique phases, wherein a reactor and a laser or lasers grow the fibers according to Laser Induced Chemical Vapor Deposition.

9. The method of claim 8, wherein fiber compositions resulting from given relative ratios of all of a set of precursor gases are plotted on a phase diagram, the phase diagram having a number of gases that is equal to the set of precursor gases for a set temperature, and wherein the relative ratios include a ratio of each of the set of precursor gases to the ratio of the number of gases, and a response surface is constructed from a set of data comprising said phase diagram, in order to develop a calibration map of the phase diagram which can be used to produce a fiber with a composition from a desired position on the phase diagram by adjusting the relative ratios of the set of precursor gases.

\* \* \* \* \*